United States Patent [19]

Takahashi et al.

[11] Patent Number: 5,034,436

[45] Date of Patent: Jul. 23, 1991

[54] SEMICONDUCTOR SEALING EPOXY RESIN COMPOSITION

[75] Inventors: Ichiro Takahashi; Hiromi Ito; Goro Okamoto; Kazuo Okahashi, all of Amagasaki; Kou Shimomura, Itami, all of Japan

[73] Assignee: Mitsubishi Denki Kabushiki Kaisha, Japan

[21] Appl. No.: 610,300

[22] Filed: Nov. 9, 1990

Related U.S. Application Data

[63] Continuation of Ser. No. 314,875, Feb. 24, 1989, abandoned.

[51] Int. Cl.$^5$ .................... C08L 83/04; C08L 63/00
[52] U.S. Cl. .................................. 523/435; 525/476
[58] Field of Search ........................ 525/476; 523/435

[56] References Cited

U.S. PATENT DOCUMENTS 4,624,998 11/1986 Keil .................................. 523/435
4,701,482 10/1987 Itoh et al. ........................ 523/435
4,720,515 1/1988 Iji et al. ........................... 523/435

FOREIGN PATENT DOCUMENTS 59-189158 10/1984 Japan.

OTHER PUBLICATIONS

172nd Meeting of the Electrochemical Society, entitle "Effect of the Molecular Weight of Silicone Flexibilizer on the Properties of Epoxy Molding Compound", Oct., 1987.

*Primary Examiner*—Lewis T. Jacobs
*Attorney, Agent, or Firm*—Leydig, Voit & Mayer

[57] ABSTRACT

A semiconductor sealing epoxy resin composition includes a flexibilizer which is a previous reactant between a denatured silicone oil having epoxy groups and a phenol novolak resin, a novolak type of epoxy resin, a hardening agent, an accelerator, a filler, a die lubricant, and a surface treatment agent. This composition has a heat and moisture resistance needs for a semiconductor sealing material, and as well as a low elastic modulus.

6 Claims, No Drawings

SEMICONDUCTOR SEALING EPOXY RESIN COMPOSITION

This application is a continuation of application Ser. No. 07/314,875, filed Feb. 24, 1989.

BACKGROUND OF THE INVENTION

The present invention relates to a semiconductor sealing epoxy resin composition, and, more particularly, to a semiconductor sealing epoxy resin composition using a flexibilizer comprising a reactant product of denatured silicone oil having an epoxy group and phenolnovolak resin, which exhibits the heat and humidity resistance of epoxy resins, as well providing a hardened material with low elasticity, great strength, and low expansion ratio.

In recent years, semiconductor devices tend to be enlarged and greatly integrated, and if such semiconductor devices are sealed by a conventional epoxy resin composition, the chip can generate cracks or the bonding wire can be cut due to the thermal stress caused between the difference in the linear thermal expansion ratio of the chip (or lead frame) and the sealing resin. The reliability of the semiconductor products therefore deteriorates. The reason for this deterioration the nature of conventional semiconductor sealing epoxy resins; they have been developed for achieving heat resistance and water resistance using a hardened material which is too hard and lacks flexibility, therefore creating great stress in the device.

In order to minimize this stress, the materials which make up the semiconductor device need to have a lower elastic modulus, expansion ratio and glass transition point. However, in order to retain the moisture resistance and head resistance, the glass transition point needs to be sufficiently high. A method of realizing a low stress comprises using a flexibilizer. However, when the conventional flexibilizer is used to lower the elastic modulus, the glass transition point of the hardened material can be excessively lowered, causing the electric characteristics and the moisture resistance of the semiconductor device to deteriorate at high temperatures, thus making it not suitable as a semiconductor sealing resin composition.

In order to improve the semiconductor's electric characteristics at high temperatures, low elastic modulus silicone resin can be used as the flexibilizer and is mixed with an epoxy resin. However, a use of the silicone resin causes deterioration in the adhesiveness between the resin and metal, thus increasing the vapor moisture transmission, leading to an unreliable moisture resistance.

As a flexibilizer exhibiting an excellent moisture resistance without lowering the glass transition point, a denatured rubber epoxy flexibilizer is proposed. This flexibilizer is obtained by reacting polybutadiene having carboxyl groups at both ends thereof, or a copolymer of a polybutadiene having carboxyl groups at both ends thereof, and acrylonitrile with an epoxy resin. However, when such flexibilizer is stored at high temperatures, unsaturated bonds in the polybutadiene structure deteriorate due to oxidation, resulting in the loss of flexibility.

Furthermore, a semiconductor sealing epoxy resin composition exhibiting an excellent heat resistance is disclosed in Japanese Patent Application Laid-Open No. 58-2322 in which phenolnovolak epoxy resin and phenolnovolak resin are mixed into the epoxy resin as the hardening agent. However, this composition suffers from insufficient crack resistance. In Japanese Patent Application Laid-Open No. 58-108220, a semiconductor sealing epoxy resin composition exhibiting excellent heat resistance (glass transition point and so on) and excellent crack resistance is disclosed which contains 0.05 to 10 wt % of a rubber component. However, this composition deteriorates when it is subjected to a high temperature standing test (strength can be lowered and its weight can be also reduced).

SUMMARY OF THE INVENTION

The present invention is an epoxy resin composition serving as a semiconductor sealing material which exhibits heat and moisture resistance, and also exhibits a low elastic modulus and great strength.

That is, a semiconductor sealing epoxy resin according to the present invention comprises: a flexibilizer which is a reaction product of a denatured silicone oil having epoxy groups and phenolnovolak resin; novolak type epoxy resin; a hardening agent; an accelerator; a filler; a dye lubricant; and a surface treatment agent.

DESCRIPTION OF THE PREFERRED EMBODIMENT

Examples of a novolak type of epoxy resin for use in the present invention include a cresol novolak type of epoxy resin, a phenolnovolak type of epoxy resin, alkyl benzene denatured phenolnovolak type of epoxy resin, and brominated phenol novolak type of epoxy resin. However, the present invention is not limited to this description. They may be used individually, or by mixing two or more of them.

Examples of a hardening agent for use in the present invention include phenolnovolak resin, cresol novolak resin, and alkyl denatured phenolnovolak resin. However, the present invention is not limited to this description. They also may be used individually or by mixing two or more of them.

Examples of an accelerator for use in the present invention only needs to be a common catalyst and can be used without any limitation; accelerators are exemplified by: phosphorus compositions such as triphenylphosphine or phosphorus triphenyl; imidazoles such as 2-methyl imidazole, 2-phenyl imidazole, 2-undecyl imidazole, 2-heptadecylimidazole, 2-ethyl-4-methyl imidazole; tertamines such as 2-(dimethyl aminomethyl) phenol, 2,4,6-tris (dimethyl aminomethyl) phenol, benzildimethylamine, α-methyl benzyl methyl amine; and salts of an organic acid such as 1,8-diazabicyclo (5, 4, 0) undecene-7 and 1,8-diazabicyclo (5, 4, 0) undecene-7. The amount of the accelerator is sufficient to be 0.15 to 1.0% (parts by weight, to be similarly used hereinafter) with respect to the weight of the resin composition except for a filler.

Examples of a filler for use in the present invention include crystal silica powder and quartz glass powder. The amount of the filler is preferably from 50 to 80% of the overall weight of the semiconductor resin composition. If the amount exceeds 80%, the fluoridity of the composition can be reduced, causing difficulty at the time of molding. If the amount is less than 50%, the linear expansion ratio can be enlarged excessively.

Examples of a dye lubricant for use in the present invention include natural wax, synthesized wax, a higher fatty acid or its metallic salt, or paraffins. The amount of the dye lubricant is preferably from 0.5 to 1% of the resin composition, except for the filler.

Examples of a surface treatment agent for use in the present invention, i.e., a surface treatment agent for the filler, includes a known silane coupling material. The amount of the surface treatment agent with respect to the filler is preferably from 0.5 to 1.5%.

In the present invention, a reaction product of the denatured silicone oil having epoxy groups and phenolnovolak resin can be obtained by adding a phosphorus compound or a imidazole compound as a catalyst to a mixture of the denatured silicone oil having epoxy groups and phenolnovolak resin, and then reacting them under a nitrogen atmosphere at 120° to 160° C. for 5 to 30 hours.

The denatured silicone oil having epoxy groups may have the epoxy groups at both ends of its molecule or in an intermediate position of the molecular chain. The resin composition using them exhibits heat and moisture resistance and also exhibits a low elastic modulus and low expansion ratio. In particular, the resin composition using denatured silicone oil having epoxy groups at both ends of the molecule is extremely preferable since it can exhibit a stability while being stocked at high temperatures.

It is preferable that the denatured silicone having epoxy groups at both ends of the molecule has an epoxy equivalent of from 500 to 5000. If the epoxy equivalent is smaller than 500, its silicone chain becomes too short, therefore, a sufficient flexibility cannot be obtained when the composition is molded. On the other hand, if it is larger than 5000, since the molar weight of the silicone oil becomes to large, the compatibility with the phenolnovolak resin can be limited so that the reaction between the epoxy groups of the silicone oil and the hydroxyl groups of the phenolnovolak resin becomes insufficient. Each case is not preferable.

It is preferable that the denatured silicone oil having epoxy groups at an intermediate position of the molecular has an epoxy equivalent of 500 to 40000, more preferably from 1000 to 20000. Furthermore, the number of the epoxy groups per molecule of the above-described denatured silicone oil is preferably 2 to 10, more preferably, 4 to 8. If the epoxy equivalent or the number of the epoxy groups per molecule deviates the above-described range, reaction with the phenolnovolak resin cannot progress sufficiently when the number of the epoxy groups is low or, if the number of the epoxy groups is too large, it can be gelled.

A novolak resin having a softening point of 60° to 110° C. is preferable.

The phenolnovolak catalyst for preparing the previously described reaction product include phosphorus compounds and imidazole, the preferred phosphine is triphenylphosphine, and the preferred imidazoles are 2-ethyl-4-methyl imidazole, 2-methylimidazole, 2-undecylimidazole, and 2-heptadecylimidazole.

The mixing ratio between the denatured silicone oil having the epoxy groups and phenolnovolak resin is preferably in an equivalent ratio (epoxy group/phenolic hydroxyl group) between the epoxy groups of the denatured silicone oil having the epoxy groups and the hydroxyl group of the phenolnovolak resin, from 0.001 to 0.3. In particular, in a case where a denatured silicone oil having epoxy resins at both ends is used, the equivalent ratio of 0.01 to 0.3 is preferable. If the equivalent ratio is smaller than 0.001, the precentage of the denatured silicone oil component in the flexibilizer becomes too small, thereby creating an insufficient flexibility effect. On the other hand, if the equivalent ratio is larger than 0.3, the denatured silicone oil and the phenolnovolak resin tend to generate a gelled state. As a result, a stable flexibilizer cannot be obtained.

The preferred amount of the catalyst, when the denatured silicone oil has the epoxy groups at the intermediate position of the molecular chain, is 0.001 to 2.0 parts with respect to 100 parts of the denatured silicone oil (parts by weight, to be used similarly hereinafter). In particular, in a case where a denatured silicone oil having the epoxy groups at an intermediate position or the molecule is used, it is preferable to be from 0.01 to 0.4 parts with respect to 100 parts of the denatured silicone oil.

In the thus-prepared product prepared by the reaction between the denatured silicone oil having epoxy groups and the phenolnovolak resin, it is preferable that more than 90% of the epoxy groups of the denatured silicone oil is reacted with the hydroxyl groups of the phenolnovolak resin. In particular, if the epoxy/hydroxyl ratio in the reaction between the denatured silicone oil having the epoxy groups at both ends of the molecule and the hydroxyl group of the phenolnovolak resin exceeds 90%, the deterioration in strength can be reduced significantly, when the thus-obtained resin composition is molded and stocked at high temperatures for a long period.

Preferably, the amount $[S]$ of the above-described flexibilizer is $[S]/([S]+[R])$, which is in the range of from 3 to 30% with respect to the amount of addition $[S]$ and the weight $[R]$ of the resin composition except for the flexibilizer and the filler. If this ratio is smaller than 3%, reduction in the elastic modulus is obtained when the composition is molded, and a sufficient flexibility effect cannot be obtained. If the ratio exceeds 30%, the glass transition point is lowered. Furthermore, at high temperatures this case tends to generate reduction in the mechanical strength and deterioration in electric characteristics.

In the composition according to the present invention, the value of the ratio between the equivalent of the epoxy groups of the novolak type epoxy resin and the total equivalents of the phenolic hydroxyl groups in the hardening agent and the flexibilizer (epoxy groups/phenolic hydroxyl groups) is preferably 0.7 to 1.3 for the purpose of achieving the object of the present invention.

In the composition according to the present invention, if necessary, coloring material such as a carbon, and flame retarding agent such as antimony trioxide, antimony pentoxide, or phosphorus salt may be added. In this case, the amount of the coloring material is 1 to 5% of the resin composition excluding the filler. The amount of the flame retarding agent is preferably 5 to 10% of the resin composition excluding the filler.

The composition according to an embodiment of the present invention will now be described with reference to examples.

EXAMPLE 1

100 parts of denatured silicone oil having epoxy groups at both ends of the molecule and having a epoxy equivalent of 25000, 84.8 parts (equivalent ratio between epoxy groups/phenolic hydroxyl groups: 0.05) of phenolnovolak resin (PSF 4261, manufactured by Gunei Chemistry Co., Ltd.), and 1 part of triphenylphosphine were reacted at 150° C. for 24 hours (with nitrogen introduced). As a result, the denatured silicone oil having the epoxy groups at both ends of the molecule and the phenolnovolak resin were reacted, thus obtaining a flexibilizer (A)

After mixing, at the ratio shown in the table, cresol novolak type of epoxy resin (EOCN 1020, manufactured by Nippon Chemistry Co., Ltd.), brominated phenolnovolak type of epoxy resin (BREN-S, manufactured by Nippon Kayaku Co., Ltd.), phenolnovolak resin serving as the hardening agent (PSF4261), accelerator, flexibilizer (A), molten silica as the filler (RD-8, manufactured by Tatsumori Co., Ltd.) and others (6 parts of antimony trioxide, 1 part of silane coupling agent, 1 part of wax and 5 parts of coloring material), the composition was kneaded by a heat roll, cooled, and then crushed. As a result, an epoxy resin composition for molding was prepared.

The thus-obtained epoxy resin composition was molded at 175° C./3 minutes, and post-hardened at 180° C./6 hours. As a result, test samples to be subjected to a hardening test were made.

Using the thus-obtained samples, bending elastic modulus (JIS K6911), glass transition point, and the volume resistivity changes before and after pressure cooker test at 121° C., 2 atmospheres for 500 hours, were measured. The results obtained are shown in the table.

In addition, the epoxy resin composition was subjected to a high temperature standing test at 200° C. for 1000 hours so as to obtain the weight reduction ratio using the following equation. The result was 0.8% which indicates a significantly excellent high temperature stability.

Weight reduction ratio (%) =

$$\frac{\text{initial weight} - \text{weight after standing at high temperature}}{\text{initial weight}} \times 100$$

EXAMPLES 2 TO 8

As shown in the table, test samples to be subjected to the hardening test were prepared similarly to that of Example 1, except for the mixing ratio of the flexibilizer (A), hardening agent, filler, and the type of accelerator. Then, the physical properties of the samples were evaluated. The results obtained are shown in the table.

EXAMPLE 9

100 parts of denatured silicone oil having epoxy groups at both ends thereof (with the epoxy equivalent of 500), 212 parts of phenolnovolak resin (PSF 4261) (equivalent ratio of the epoxy groups/phenolic hydroxyl groups: 0.1), and 1.5 parts of triphenylphosphine were reacted as described in Example 1, so that flexibilizer (B) was obtained. Test samples to be subjected to a hardening test were prepared similarly to that of Example 1, except for using the flexibilizer (B) and other components as shown in Table 1. Then, physical properties of the samples were evaluated, and the results obtained are shown in the table.

EXAMPLE 10

100 parts of denatured silicone oil having epoxy groups at both ends (with the epoxy equivalent of 5000), 42.4 parts of phenolnovolak resin (PSF 4261) (equivalent ratio of the epoxy groups/phenolic hydroxyl groups: 0.05), and 0.8 parts of triphenylphosphine were reacted as described in Example 1, so that flexibilizer (C) was obtained. Test samples to be subjected to a hardening test were prepared similarly to that of Example 1, except for using flexibilizer (C) and other components as shown in the table. Then, physical properties of the samples were evaluated, and the results obtained are shown in the table.

EXAMPLE 11

100 parts of denatured silicone oil having epoxy groups at both ends (with the epoxy equivalent of 2500), 84.8 parts of phenolnovolak resin (PSF 4261) (equivalent ratio of the epoxy groups/phenolic hydroxyl groups: 0.05), and 0.8 parts of 2-ethyl-4-methylimidazole were reacted as described in Example 1, so that flexibilizer (D) was obtained. Test samples to be subjected to a hardening test were prepared similarly to that of Example 1, except for using flexibilizer (D) and other components as shown in the table. Then, physical properties of the samples were evaluated, and the results obtained are shown in the table.

EXAMPLE 12

100 parts of denatured silicone oil having epoxy groups at the intermediate position (with the epoxy equivalent of 8500), 24.9 parts of phenolnovolak resin (PSF 4261, manufactured by Gunei Chemistry Co., Ltd.) (equivalent ratio of the epoxy groups/phenolic hydroxyl groups: 0.05), and 0.1 parts of triphenylphosphine were reacted as described in Example 1, so that flexibilizer (E) was obtained. Test samples to be subjected to a hardening test were prepared similarly to that of Example 1, except for using flexibilizer (E) and other components as shown in the table. Then, physical properties of the samples were evaluated, and the results obtained are shown in the table.

In addition, similar to Example 1, a high temperature standing test was conducted so as to obtain the weight reduction ratio. The result was 1.6%, which indicates an excellent high temperature stability.

EXAMPLES 13 TO 19

Test samples to be subjected to a hardening test were prepared as described in Example 12, except for using the mixing ratio of flexibilizer (E), hardening agent and the filler as shown in the table, and changing the type of the accelerator. Then, physical properties of the samples were evaluated, and the results obtained are shown in the table.

EXAMPLE 20

100 parts of denatured silicone oil having epoxy groups at the intermediate position (with the epoxy equivalent of 500), 212 parts of phenolnovolak resin (PSF 4261) (equivalent ratio of the epoxy groups/phenolic hydroxyl groups: 0.1), and 0.8 parts of triphenylphosphine were reacted as described in Example 1, so that flexibilizer (F) was obtained. Test samples to be subjected to a hardening test were prepared similar to that of Example 1, except for using flexibilizer (F) and other components as shown in the table. Then, physical properties of the samples were evaluated, and the results obtained are shown in the table.

EXAMPLE 21

100 parts of denatured silicone oil having epoxy group at the intermediate position (with the epoxy equivalent of 20000), 10.6 parts of phenolnovolak resin (PSF 4261) (equivalent ratio of the epoxy groups/phenolic hydroxyl groups: 0.05), and 0.05 parts of triphenylphosphine were reacted as described in Example 1, so that flexibilizer (G) was obtained. Test samples to be subjected to a hardening test were prepared similar to that of Example 1, except for using flexibilizer (G) and other components as shown in the table. Then, physical properties of the samples were evaluated, and the results obtained are shown in the table.

EXAMPLE 22

100 parts of denatured silicone oil having epoxy groups at the intermediate position (with the epoxy equivalent of 8500), 249 parts of phenolnovolak resin (PSF 4261) (equivalent ratio of the epoxy groups/phenolic hydroxyl groups: 0.05), and 0.05 parts of 2-ethyl-4-methylimidazole were reacted as described in Example 1, so that flexibilizer (H) was obtained. Test samples to be subjected to a hardening test were prepared similar to that of Example 1, except for using flexibilizer (H) and other components as shown in the table. Then, physical properties of the samples were evaluated, and the results obtained are shown in the table.

COMPARATIVE EXAMPLES 1 TO 4

As the flexibilizer, DFR736 (manufactured by Dow Chemical) or Araldite GY298 (manufactured by Chiba Gaigi) was used so that sealing epoxy resin compositions whose compositions are as shown in the table were prepared. Then, test samples to be subjected to the hardening test were prepared similar to that of Example 1 so as to evaluate their physical properties. The results obtained are shown in the table.

COMPARATIVE EXAMPLES 5 AND 6

Sealing epoxy resin compositions whose compositions are shown in the table were prepared without using a flexibilizer. Then, test samples to be subjected to the hardening test were prepared similar to that of Example 1. Then, physical properties of the samples were evaluated, and the results obtained are shown in the table.

| | Composition | | | | | |
|---|---|---|---|---|---|---|
| | Novolak type Epoxy resin (parts) | | | Hardening agent (part) | Accelerator (parts) | |
| Example NOs | EOCH 1020 (epoxy equivalent 202) | EOCH 102 S (epoxy equivalent 220) | BREH-S[1] | PSF 4261 (hydroxyl equivalent 106) | Triphenyl-phosphine | 2-ethyl-4-methyl-imidazole |
| 1 | 90 | — | 10 | 38.2 | 1 | — |
| 2 | 90 | — | 10 | 47.1 | 1 | — |
| 3 | 90 | — | 10 | 12.5 | 1 | — |
| 4 | 90 | — | 10 | 38.2 | 1 | — |
| 5 | 90 | — | 10 | 38.2 | 1 | — |
| 6 | 90 | — | 10 | 58.0 | 1 | — |
| 7 | 90 | — | 10 | 27.4 | 1 | — |
| 8 | 90 | — | 10 | 38.2 | — | 1 |
| 9 | 90 | — | 10 | 30.5 | 1 | — |
| 10 | 90 | — | 10 | 42.0 | 1 | — |
| 11 | 90 | — | 10 | 37.1 | 1 | — |
| 12 | — | 90 | 10 | 44.3 | 1 | — |
| 13 | — | 90 | 10 | 46.3 | 1 | — |
| 14 | — | 90 | 10 | 36.3 | 1 | — |
| 15 | — | 90 | 10 | 64.5 | 1 | — |
| 16 | — | 90 | 10 | 33.4 | 1 | — |
| 17 | — | 90 | 10 | 44.3 | 1 | — |
| 18 | — | 90 | 10 | 44.3 | 1 | — |
| 19 | — | 90 | 10 | 44.3 | — | 1 |
| 20 | — | 90 | 10 | 37.1 | 1 | — |
| 21 | — | 90 | 10 | 45.9 | 1 | — |
| 22 | — | 90 | 10 | 44.3 | 1 | — |
| Comparative Example Nos | | | | | | |
| 1 | 90 | — | 10 | 62.4 | 1 | — |
| 2 | 90 | — | 10 | 58.4 | 1 | — |
| 3 | — | 90 | 10 | 53 | 1 | — |
| 4 | — | 90 | 10 | 51 | 1 | — |
| 5 | 90 | — | 10 | 50.9 | 1 | — |
| 6 | — | 90 | 10 | 47.3 | 1 | — |

| | Composition | | | | | | | | | | |
|---|---|---|---|---|---|---|---|---|---|---|---|
| | Flexibilizer (parts) | | | | | | | | | Filler | |
| Example NOs | A | B | C | D | E | F | G | H | DER 736 | GY 298 | (parts) RD-8 | Others[2] (parts) |
| 1 | 27.7 | — | — | — | — | — | — | — | — | — | 420 | 13 |
| 2 | 8.4 | — | — | — | — | — | — | — | — | — | 400 | 13 |
| 3 | 83.7 | — | — | — | — | — | — | — | — | — | 490 | 13 |
| 4 | 27.7 | — | — | — | — | — | — | — | — | — | 270 | 13 |
| 5 | 27.7 | — | — | — | — | — | — | — | — | — | 609 | 13 |
| 6 | 32.0 | — | — | — | — | — | — | — | — | — | 476 | 13 |
| 7 | 25.7 | — | — | — | — | — | — | — | — | — | 390 | 13 |
| 8 | 27.7 | — | — | — | — | — | — | — | — | — | 420 | 13 |
| 9 | — | 30 | — | — | — | — | — | — | — | — | 407 | 13 |
| 10 | — | — | 30 | — | — | — | — | — | — | — | 434 | 13 |
| 11 | — | — | — | 30 | — | — | — | — | — | — | 423 | 13 |

-continued

| # | | | | | | | | | | | | |
|---|---|---|---|---|---|---|---|---|---|---|---|---|
| 12 | — | — | — | — | 15 | — | — | — | — | — | 409 | 15 |
| 13 | — | — | — | — | 5 | — | — | — | — | — | 390 | 15 |
| 14 | — | — | — | — | 55 | — | — | — | — | — | 484 | 15 |
| 15 | — | — | — | — | 15 | — | — | — | — | — | 456 | 15 |
| 16 | — | — | — | — | 15 | — | — | — | — | — | 384 | 15 |
| 17 | — | — | — | — | 15 | — | — | — | — | — | 263 | 15 |
| 18 | — | — | — | — | 15 | — | — | — | — | — | 526 | 15 |
| 19 | — | — | — | — | 15 | — | — | — | — | — | 409 | 15 |
| 20 | — | — | — | — | — | 15 | — | — | — | — | 392 | 15 |
| 21 | — | — | — | — | — | — | 15 | — | — | — | 413 | 15 |
| 22 | — | — | — | — | — | — | — | 15 | — | — | 409 | 15 |
| Comparative Example Nos | | | | | | | | | | | | |
| 1 | — | — | — | — | — | — | — | — | 30 | — | 482 | 13 |
| 2 | — | — | — | — | — | — | — | — | — | 30 | 472 | 13 |
| 3 | — | — | — | — | — | — | — | — | 15 | — | 429 | 15 |
| 4 | — | — | — | — | — | — | — | — | — | 15 | 425 | 15 |
| 5 | — | — | — | — | — | — | — | — | — | — | 385 | 13 |
| 6 | — | — | — | — | — | — | — | — | — | — | 381 | 15 |

Note:
[1] Epoxy equivalent 285 in Examples 1 to 11, and comparative Examples 1, 2 and 5, while the same of 270 in Examples 12 to 22, and comparative Examples 3, 4 and 6.
[2] In Examples 1 to 11 and comparative Examples 1, 2 and 5, 6 parts of antimony trioxide, 1 part of coupling agent, 1 part of wax, and 5 parts of coloring material, while in Examples, 3, 4, and 6, 6 parts of antimony trioxide, 2 parts of silane coupling agent, 2 parts of wax, and 5 parts of coloring material.

Result of the Evaluation

| Bending Elastic Modulus (kg/mm$^2$) | Glass Transition Point (°C.) | Volume Resistivity ($\Omega$ - cm) | |
|---|---|---|---|
| | | Initial Stage | After subjecting pressure cooker test |
| 1240 | 161 | $4.0 \times 10^{16}$ | $3.5 \times 10^{14}$ |
| 1330 | 163 | $4.5 \times 10^{16}$ | $3.9 \times 10^{14}$ |
| 1020 | 158 | $3.8 \times 10^{16}$ | $3.5 \times 10^{14}$ |
| 1010 | 162 | $4.2 \times 10^{16}$ | $3.2 \times 10^{14}$ |
| 1440 | 162 | $4.1 \times 10^{16}$ | $3.3 \times 10^{14}$ |
| 1230 | 160 | $3.9 \times 10^{16}$ | $2.7 \times 10^{14}$ |
| 1200 | 158 | $3.7 \times 10^{16}$ | $2.5 \times 10^{14}$ |
| 1210 | 166 | $4.3 \times 10^{16}$ | $2.3 \times 10^{14}$ |
| 1280 | 160 | $4.1 \times 10^{16}$ | $3.5 \times 10^{14}$ |
| 1190 | 159 | $4.2 \times 10^{16}$ | $2.9 \times 10^{14}$ |
| 1230 | 160 | $3.9 \times 10^{16}$ | $2.8 \times 10^{14}$ |
| 1220 | 164 | $4.5 \times 10^{16}$ | $3.7 \times 10^{14}$ |
| 1310 | 165 | $4.0 \times 10^{16}$ | $3.2 \times 10^{14}$ |
| 1030 | 156 | $3.7 \times 10^{16}$ | $2.9 \times 10^{14}$ |
| 1230 | 162 | $3.5 \times 10^{16}$ | $2.7 \times 10^{14}$ |
| 1250 | 165 | $4.2 \times 10^{16}$ | $3.8 \times 10^{14}$ |
| 1010 | 166 | $4.3 \times 10^{16}$ | $3.9 \times 10^{14}$ |
| 1380 | 165 | $4.8 \times 10^{16}$ | $4.2 \times 10^{14}$ |
| 1240 | 167 | $5.0 \times 10^{16}$ | $3.8 \times 10^{14}$ |
| 1260 | 162 | $4.8 \times 10^{16}$ | $3.2 \times 10^{14}$ |
| 1190 | 160 | $5.1 \times 10^{16}$ | $3.9 \times 10^{14}$ |
| 1230 | 165 | $4.7 \times 10^{16}$ | $3.5 \times 10^{14}$ |
| 1150 | 122 | $1.5 \times 10^{16}$ | $4.3 \times 10^{12}$ |
| 1230 | 130 | $2.5 \times 10^{16}$ | $2.5 \times 10^{12}$ |
| 1200 | 133 | $2.8 \times 10^{16}$ | $8.5 \times 10^{12}$ |
| 1250 | 140 | $3.0 \times 10^{16}$ | $5.0 \times 10^{12}$ |
| 1640 | 164 | $6.5 \times 10^{16}$ | $5.2 \times 10^{14}$ |
| 1650 | 168 | $6.8 \times 10^{16}$ | $5.3 \times 10^{14}$ |

As can be clearly seen from the above-described results, the semiconductor sealing epoxy resin composition according to the present invention exhibits heat and moisture resistance, and has a low elastic modulus. In particular, when the semiconductor sealing epoxy resin composition uses the denatured silicone oil having the epoxy groups at both ends of the molecule is used the denatured silicone oil provides significantly excellent high temperature stability. Consequently, it is preferably used as the semiconductor sealing epoxy resin composition.

We claim:

1. A semiconductor sealing epoxy resin composition comprising:

a flexibilizer which is a reaction product of a modified silicone oil having epoxy groups and phenol-novolak resin, wherein said modified silicone oil has epoxy groups at both ends of a molecule thereof, wherein the epoxy equivalent of said modified silicone oil is 500 to 5000 and wherein the ratio of epoxy groups in the silicone oil to phenolic hydroxyl groups in the phenolnolak resin is from 0.001 to 0.3;

novolak epoxy resin;

a hardening agent having phenolic hydroxyl groups;

an accelerator;

a filler;

a dye lubricant; and a surface treatment agent;

and wherein the ratio between the equivalent of the epoxy groups of said novolak epoxy resin and the total equivalents of the phenolic hydroxyl groups in said hardening agent and said flexibilizer is in the range of 0.7 to 1.3.

2. A semiconductor sealing epoxy resin composition comprising:

a flexibilizer which is a reaction product of a modified silicone oil having epoxy groups and phenol-novolak resin wherein said modified silicone oil has epoxy groups at an intermediate position of a molecule chain thereof, wherein the epoxy equivalent of said modified silicon oil is 500–40000 and wherein the ratio of epoxy groups in the silicone oil to phenolic hydroxyl groups in the phenolnovolak resin is from 0.001 to 0.3;

novolak epoxy resin;

a hardening agent having phenolic hydroxyl groups;

an accelerator;

a filler;

a dye lubricant; and a surface treatment agent;

and wherein the ratio between the equivalent of the epoxy groups of said novolak epoxy resin and the total equivalents of the phenolic hydroxyl groups in said hardening agent and said flexibilizer is in the range of 0.7 to 1.3.

3. A semiconductor sealing epoxy resin composition comprising:

a flexibilizer comprising the reaction product of a modified silicone oil and a phenol novolak resin;
a novolak epoxy resin;
a hardening agent;
an accelerator;
a filler;
a dye lubricant; and
a surface treatment agent;
wherein said silicone oil has 2 to 10 epoxy groups per molecule and the epoxy equivalent of said modified silicone oil is from 500 to 5000, and wherein the ratio of epoxy groups of said modified silicone oil to the hydroxyl groups of said phenol novolak resin is in the range of 0.001 to 0.3, and wherein said reaction product has more than 90% of the epoxy groups of said modified silicone oil are reacted with the hydroxyl groups of said phenol novolak resin;
and wherein the ratio of the epoxy equivalent of said novolak epoxy resin to the total epoxy equivalents of hydroxyl groups in said hardening agent and said flexibilizer is in the range of 0.7 to 1.3.

4. The composition of claim 3 wherein the following amounts are used: 100 parts silicone oil; 10.6 to 212 parts phenolnovolak resin; 10 to 90 parts novolak epoxy resin; 12.5 to 64.5 parts hardening agent; 1 part accelerator; and 263 to 609 parts filler.

5. The semiconductor sealing epoxy resin of claim 2 wherein the number of epoxy groups per molecule of silicone oil is from about 2 to about 10.

6. The semiconductor sealing epoxy resin of claim 1 wherein the amount of said flexibilizer is 3% to 30% of the weight of the resin composition in which flexibilizer and filler are not included.

* * * * *